United States Patent [19]
Sheinfeld et al.

[11] Patent Number: 5,690,094
[45] Date of Patent: Nov. 25, 1997

[54] GAS FLAME KETTLE

[75] Inventors: Naftali Sheinfeld, Mobile Post N. Yehuda; Shmuel Huss, Jerusalem; Ilya Shmuelson, Lod, all of Israel

[73] Assignee: Etzion Metal Works, Yehuda, Israel

[21] Appl. No.: 637,706

[22] PCT Filed: Aug. 29, 1994

[86] PCT No.: PCT/US94/09689
§ 371 Date: May 8, 1996
§ 102(e) Date: May 8, 1996

[87] PCT Pub. No.: WO95/07440
PCT Pub. Date: Mar. 16, 1995

[30] Foreign Application Priority Data
Sep. 9, 1993 [IL] Israel ............... 106.960

[51] Int. Cl.⁶ ........................... F24H 1/00
[52] U.S. Cl. ............ 126/350 R; 126/344; 126/265; 126/373; 126/39 E; 126/39 BA; 431/255; 431/256
[58] Field of Search ............ 126/350 R, 344, 126/265, 266, 39 BA, 39 E, 262, 264, 38, 40; 431/255, 256, 344

[56] References Cited

U.S. PATENT DOCUMENTS

| | | | |
|---|---|---|---|
| 3,709,198 | 1/1973 | Williams | 126/350 R |
| 3,730,165 | 5/1973 | Williams | 126/266 |
| 3,978,844 | 9/1976 | Wilkens | 126/38 |
| 4,191,173 | 3/1980 | Dedeian | 126/265 |
| 4,512,328 | 4/1985 | Arad | 126/265 |
| 4,829,981 | 5/1989 | Burrell | 126/265 |

*Primary Examiner*—James C. Yeung
*Attorney, Agent, or Firm*—Felfe & Lynch

[57] ABSTRACT

A gas-flame heated, self-contained kettle comprises a housing (12); a gas burner (14) contained within the housing (12); a container (16) for the fluid (18) to be heated, positioned within the housing (12) and above the burner(14); and exhaust duct (22) leading from an area (24) above the burner (14), through the container (16), and out of a surface of the housing (12). Excess heat and combustion gases are exhausted in heat-exchanged contact with fluid in the container (16) via the ducts (22), for augmented heating of the fluid with simultaneous protection and insulation of the housing (12).

13 Claims, 3 Drawing Sheets

GAS FLAME KETTLE

The present invention relates to a gas-flame heated kettle. More particularly, the invention provides a portable, efficient, safe, self-contained kettle and gas burner which can be operated in any location where there is an air atmosphere.

The provision of hot drinks is often appreciated by people who are away from their homes or workplaces, whether they are on an outing or picnic, or whether because of the demands of their professions, they are at an outdoor site where there is no available electric power. Soldiers on reserve duty also require hot drinks when out in the field.

The insulated thermos bottle has long provided a convenient method of holding small quantities of hot water or beverages. A well-designed thermos container will keep its contents relatively hot for a day, but provides unsatisfactory hot storage for longer periods of time.

For those travelling by automobile, there is available a water heater which is powered by the vehicle battery through the socket of the cigarette lighter. Water heating is rather slow; vehicle batteries are not intended for this type of service.

Small quantities of water can be suitably heated with chemical fuel tablets, provided that the water container is provided with suitable support means.

For those who are willing to search for natural fuel such as small tree branches and to build a fire therefrom, there is available a folding cooker which, when deployed, shields the fire and supports but does not shield a cooking vessel, which is not included in the cooker pack. The cooker is held in a compact belt pouch when not in use.

There is little doubt that, where larger quantities of hot fluid are required in a reasonably short time, the portable gas cooker provides the most convenient solution. Such devices comprise a container of cooking gas, which is rechargeable and usually has a capacity in the range of 0.5 to 5 kg, the container serving as a base for a gas burner, control tap and kettle stand, all of which are provided and connected to said container from above.

Similar but smaller gas flame cookers are available which are intended to be assembled to disposable gas containers, which usually hold between 150 and 500 grams of compressed cooking gas. The smallest size disposable container may be obtained for one-time use. No gas control is provided; the user simply punctures the upper dome of the container and ignites the emitted gas stream.

As is well-known to hikers and campers, the various flame-operated cookers described above require protection from strong winds, for two reasons. First, the area of the flame requires protection to prevent its extinction. Second, the fluid container also requires protection, as the high heat losses resulting from forced convection from the fluid container's outer walls will result in an unreasonably long heating time to bring the fluid to boil. Provision of such protection usually falls on the user.

There is no known portable fluid heating device which combines a protected burner and protected fluid container. Furthermore, the fuel-operated devices described above are not provided with their own ignition sources.

It is therefore one of the objects of the present invention to obviate the disadvantages of the prior art portable fluid heaters and to provide a gas-operated fluid heater for water, coffee, tea, soups and the like which is fast, efficient, self-contained and can be operated anywhere in the atmosphere.

The present invention achieves the above objectives by providing a gas-flame heated, self-contained kettle comprising a housing, a gas burner container within the housing, and a container for the fluid to be heated, positioned within the housing and above the burner. Exhaust ducts lead from an area above the burner, through the container and a surface thereof, to the outside. Excess heat and combustion gases are exhausted in heat-exchange contact with fluid via ducts in the container for augmented heating of the fluid with simultaneous protection and insulation of the housing.

While in most cases the fluid in the container will be water, other fluids such as soups, tea, coffee, etc. can obviously also be heated in the kettle of the present invention.

In a preferred embodiment of the present invention, there is provided a gas-flame heated, self-contained kettle as described above, but further comprising a chamber within the housing for containing a compressed gas container, and a gas feed line leading from the compressed gas container to the gas burner.

In a most preferred embodiment of the present invention, there is provided an automatic shut-off, gas-flame heated, self-contained kettle, comprising a housing, a gas burner contained within the housing, and a container for the fluid to be heated positioned within the housing and above the burner. Exhaust ducts lead from an area above the burner through the container and a surface thereof, to the outside. Also provided are a chamber within the housing for containing a compressed gas container, a gas feed line leading from the compressed gas container to the gas burner, and an automatic shut-off valve for closing the gas feed line. This valve is operatively linked to a plurality of sensors which close the valve in the absence of a flame at the burner, or in the absence of fluid in the fluid container, or on the attainment of a preset temperature in the fluid.

The burner used in the present invention is preferably of the type producing a concentrated rotating flame, as described in Israel Patent No. 66538 and corresponding U.S. Pat. NO. 4,583,941 (Elperin, et al.), the teachings of which are incorporated herein by reference.

Cooking vessels having an outer jacket surrounding an inner cooking cheer through which steam or heat passes have been known for more than 100 years, as can be seen, e.g., from U.S. Pat. Nos. 474,622; 1,169,006; 1,746,261; 1,212,661; 2,483,069; 4,467,783 and 5,125,393. However, none of said patents teaches or suggests a gas-flame heated, self-contained kettle as defined herein, wherein exhaust ducts lead from an area above a burner forming an integral part of said vessel through passages provided in the container itself, whereby said passages are surrounded by the liquid to be heated and therefore totally absorb the heat radiating therefrom instead of allowing the same to heat the outer surface of the housing, as occurs in all of the above patents.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 1A:
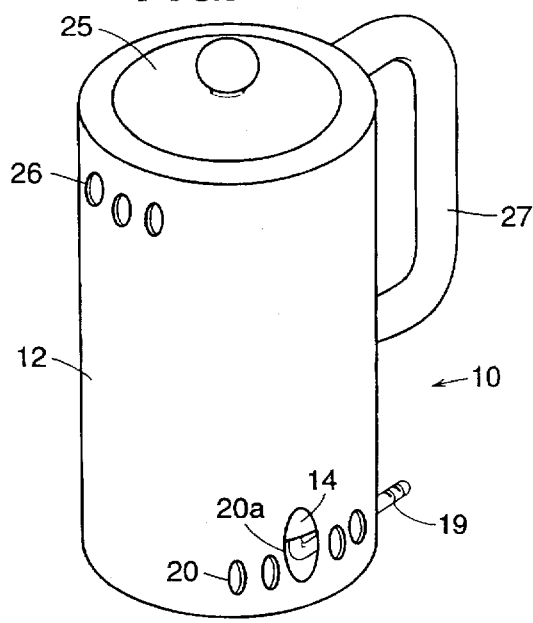
FIG. 1a shows a perspective view of a preferred embodiment of the kettle according to the invention.
Figure 1B:
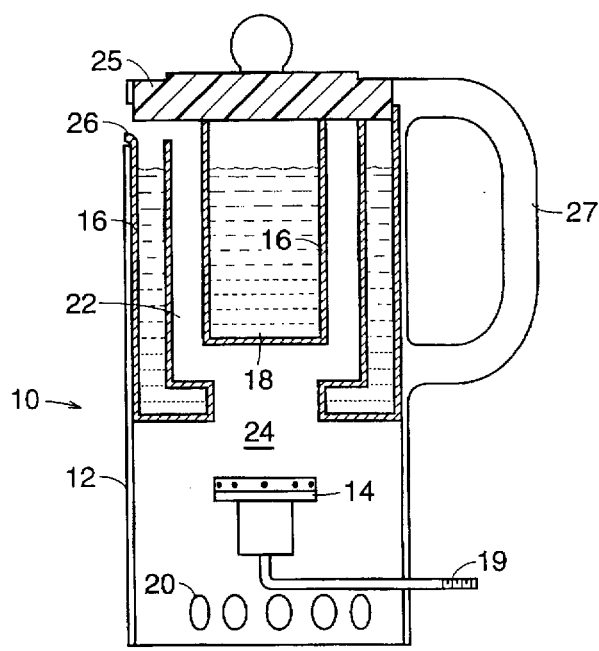
FIG. 1b is a diagrammatic view of the embodiment of FIG. 1.

Referring now to the drawings, there is seen in FIGS. 1a and 1b a gas-flame heated, self-contained kettle 10, having a lid 25 and a handle 27. Housing 12 serves to contain and shield from wind a gas burner 14 and a container 16 for the fluid 18 to be heated. Housing 12 may suitably be made of any suitable material having good heat resistance, for example, a thermoplastic polymer such as a glass-reinforced acetal, nylon or polycarbonate. At slightly higher cost, it is possible to use a thermoset polymer and to thus produce a housing resistant to higher temperatures.

For example, a glass-reinforced phenolic can be used to produce a black or brown coloured housing which is stable at 260° C.

The gas burner 14 is positioned in the lower part of the housing 12 and is provided with a gas entry port 19, to allow its connection to an external source of cooking gas (not shown).

Air inlet apertures 20 are provided in the lower part of the housing 12. One of these apertures 20a is sufficiently large to provide access for manual ignition.

Container 16 for the fluid 18 to be heated can suitably be made of any material used for cooking pots, such as steel or aluminum. The container 16 is positioned in housing 12 above burner 14. A container 16 holding one liter of fluid can be brought to the boiling point in under 3 minutes.

Exhaust ducts 22 lead from area 24 above burner 14 through the container 16 and out of surface 26 of housing 12. Excess heat and combustion gases are exhausted therethrough in heat-exchange contact with fluid 18, via ducts 22, for augmented heating of fluid 18. A further advantage of ducts 22 is the provision of simultaneous protection and insulation of housing 12, thus making possible the use of a thermoplastic polymer, as mentioned above.

Kettle 10 is a light-weight, low-cost embodiment, which can be connected to any type of gas container.

Figure 2:
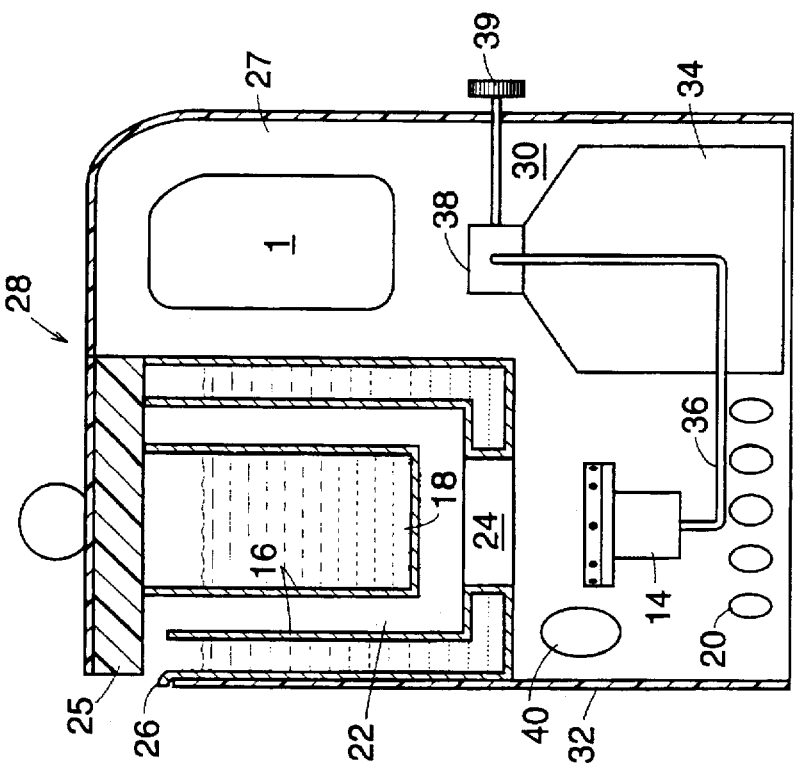
FIG. 2 is a diagrammatic view of an embodiment provided with its own gas supply.

FIG. 2 shows an embodiment of kettle 28, provided with its own supply of gas fuel, but otherwise similar to kettle 10. A chamber 30 is provided within housing 32 for containing a compressed gas container 34. A gas feed line 36 leads from container 34 to the gas burner 14. Advantageously, gas feed line 36 is further provided with a gas control valve 38, accessible through a handle 39 from outside the housing 32. An aperture 40 is provided in housing 32 to allow access for manual ignition. Thus kettle 28 is a self-contained unit, being provided with a fluid container 16, a gas burner 14, a gas container 34 and a shielding housing 32. It is manually ignited and extinguished, and manufacturable at moderate cost. The housing is of molded plastic and includes an aperture 1 forming an integral gripping handle 27.

Figure 3:
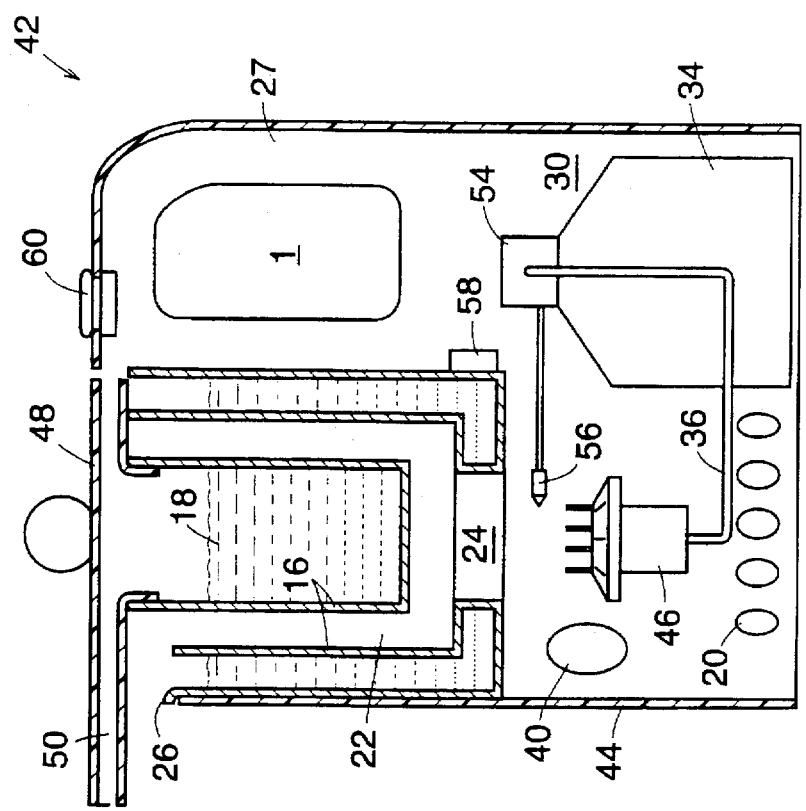
FIG. 3 is a diagrammatic view of an embodiment provided with automatic shut-off devices.

FIG. 3 depicts an automatic shut-off, gas-flame heated, self-contained kettle 42. Housing 44 contains near its base a gas burner 46, preferably of the type producing a concentrated rotating flame, as described in Israel Patent No. 66538 and corresponding U.S. Pat. No. 4,583,941. Such a burner has an efficiency which is 20–30% higher than that of a similar conventional burner, achieved by reducing excess air intake and wasteful radiation, as is fully described in said patents. fluid container 16 and its associated exhaust ducts 22 are as described above with reference to FIGS. 1a and 1b. Housing 44 is provided with cover 48, having a spout 50 in fluid communication with fluid container 16, for pouring fluid 18 therefrom.

Chamber 30 is provided within housing 44, for containing a compressed gas container 34. Container 34 is preferably disposable, the advantage being weight reduction of the kettle 42. A gas feed line 36 leads from container 34 to gas burner 46. An automatic shut-off valve 54 is provided for closing the gas feed line 36. Valve 54 is operatively linked to a plurality of sensors 56, 58, 60, which effect its closure in the absence of a flame at burner 46, in the absence of fluid 18 in container 16, or upon the attainment of a preset temperature within fluid 18. Suitably sensor 60 is a steam sensor, for sensing the evolution of steam from the heated fluid and for closing valve 54. The operation of these sensors will be more fully described below, with reference to FIG. 4a.

Figure 4B:
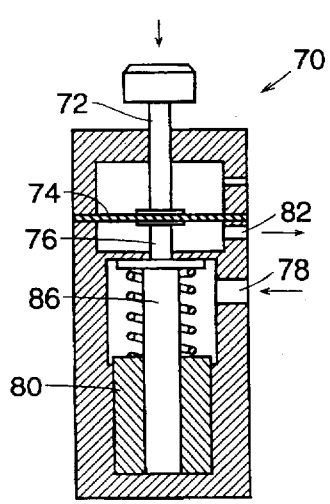
FIG. 4b is a cross-sectional elevational view of a shut-off valve suitable for use in the kettle.
Figure 4A:
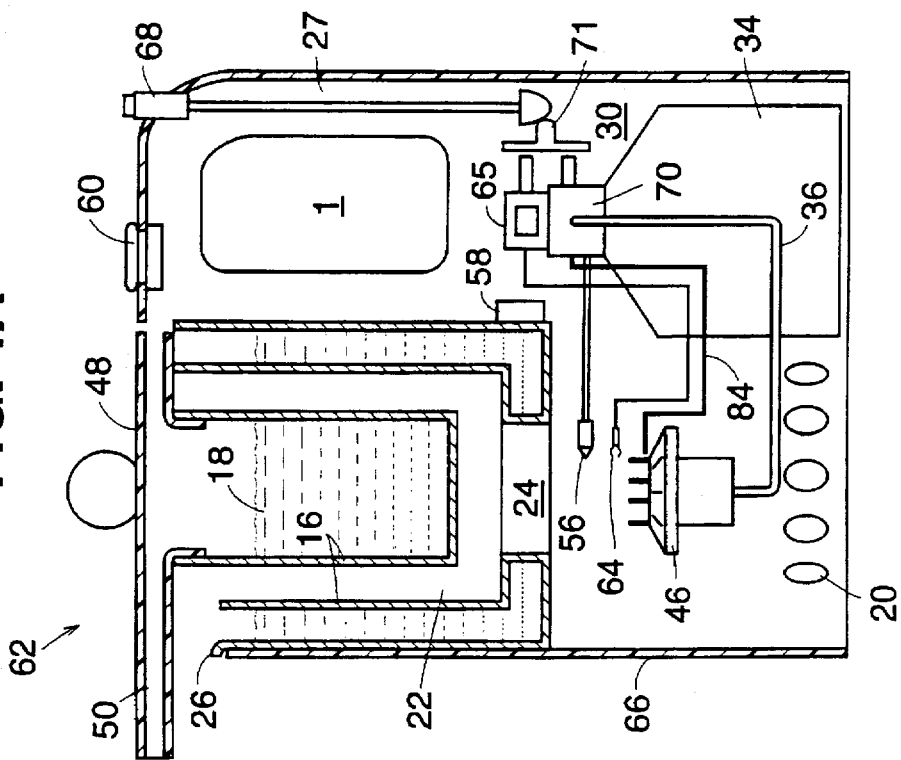
FIG. 4a is a diagrammatic view of a kettle provided with its own ignition means.

FIG. 4a depicts a kettle 62, which is similar to kettle 42 but is also provided with an ignition device and further controls.

A mechanically-operated spark ignition device, comprising electrodes 64 and voltage generator 65, is provided in housing 66, being arranged to project sparks above the area of gas burner 46. Advantageously, device 64, 65 is operated by means of a manually-operated "ON" control 68, which also opens the shut-off valve 70 by the mechanical action resulting from pressure applied by the user to move the "ON" control downwards, and operates mechanism 71.

FIG. 4b shows details of the gas shut-off valve 70. In order to obviate the need for 0-rings around valve stem 72, which would be likely to allow leakage of pressurized gas, the shut-off valve 70 is provided with membrane 74, through which mechanical action is transferred from the "ON" control 68 to the valve spool 76, thereby resulting in a leakproof valve so that the gas inlet 78 of said valve may be connected to a source of high-pressure gas without any leakage.

Shut-off valve 70 is further provided with a solenoid 80, which has an electrical rating allowing it to retain its open position by the holding current supplied by a thermocouple 84, which projects into the hot area of gas burner 46. The gas outlet valve 82 is connected to gas feed line 36. The electric power obtained from thermocouple 84 charges solenoid 80 sufficiently to maintain the valve in its open position, after release by the user of the "ON" control 68.

The following typical electrical values apply:

| | |
|---|---|
| Voltage produced by heated thermocouple | 3–40 mV |
| Ohmic resistance of solenoid coil | 13–18 mOhm |
| Solenoid holding current | 150–250 mA |

It is to be noted that the thermocouple 84 is not required to supply the power needed to move the valve spool from its open position; such movement is provided by the user pushing the "ON" control 68.

Sensors 56, 58 and 60 are arranged in series in an electrical circuit, together with thermocouple 84 and solenoid 80. When any sensor is activated, power is cut off from solenoid 80 and the valve 70 closes to prevent further discharge of gas. The closing force may be provided by the distorted membrane 74 as it regains its original disk-like shape.

Sensor 56 responds to the absence of a flame at burner 46 and cuts off the electric current supplied by thermocouple 84, which has been previously heated and, while remaining hot, continues to supply power to solenoid 80.

Similarly, sensor 58 responds to the absence of fluid 18 in fluid container 16 when burner 46 is in operation, by sensing an abnormally high temperature at the wall of fluid container 16; it also reacts by cutting off the electric current supplied by thermocouple 84.

Preferably, spring 86 is provided to close valve 70 when the solenoid 80 is not energized, thereby closing off the gas supply to burner 46. Operation of the "ON" control 68 will cause valve spool 76 to move against the small force exerted by spring 86 and to open valve 70.

By means of provision of the sensors described above, a high degree of safety is achieved.

Figure 5:
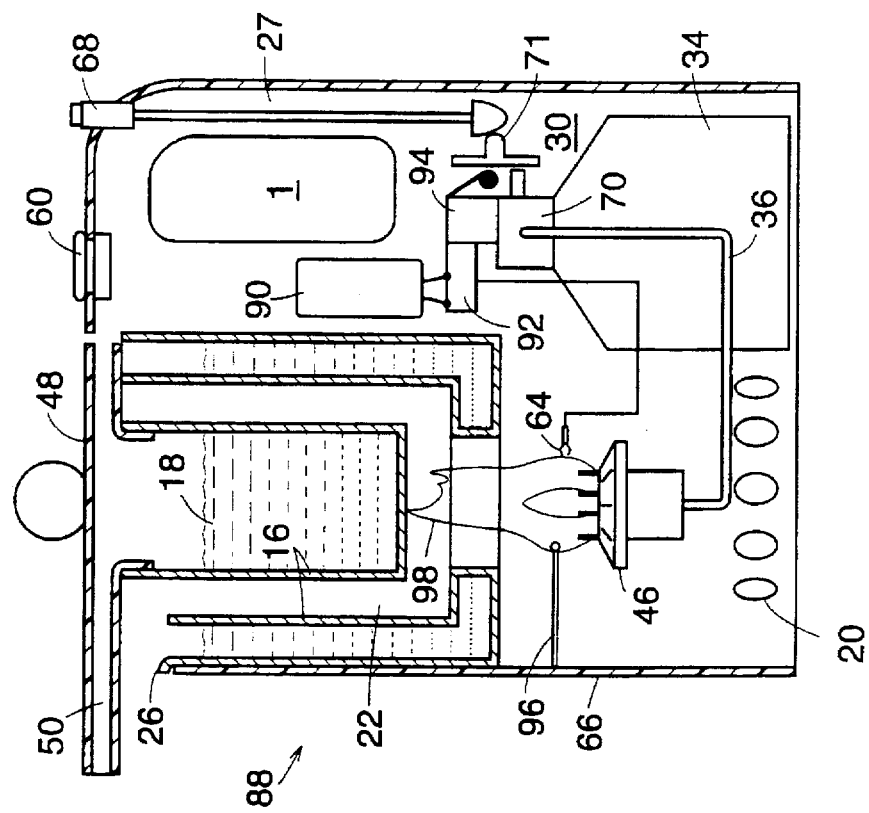
FIG. 5 is a diagrammatic view of a further embodiment of the invention, provided with means for re-ignition of an extinguished gas flame.

Shown in FIG. 5 is kettle 88, provided with reignition means, but otherwise similar to kettle 62 described above with reference to FIGS. 4a and 4b.

An electric battery 90 is provided in housing 66, and is connected to operate a spark ignition device comprising a voltage amplifier 92 and electrodes 64. Operation of the ignition device occurs when a normally "OFF" switch 94 is in its "ON" state.

Ion sensor 96 projects into gas flame 98. Upon extinguishing of flame 98, the sensor 96 reacts to a sharp reduction in ions present near the sensor head. Sensor 96 then acts to bring the switch 94 into its "ON" state, whereby the device 92, 64 will attempt to reignite the extinguished gas flame. As with other gas-fueled cooking devices, the flame 98 may be extinguished due to fluid spilling on burner 46, or because of unusual wind conditions. Automatic reignition as provided will prevent the unwanted discharge of cooking gas and thus will provide a further degree of safety and convenience for the user.

It is to be noted that no thermocouple is required, as the battery 90 is utilized to also provide power to hold valve 70 open during operation of the kettle.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An automatic shut-off, gas-flame heated, self-contained kettle, comprising:
    a housing;
    a gas burner contained within said housing;
    a container for the fluid to be heated, positioned within said housing and above said burner;
    a chamber within said housing for containing a compressed gas container;
    a gas feed line leading from said compressed gas container to said gas burner;
    exhaust ducts leading from an area above said burner, through said container, and out of a surface of said housing, whereby excess heat and combustion gases are exhausted in heat-exchange contact with fluid in said container via said ducts, for augmented heating of said fluid with simultaneous protection and insulation of said housing; and
    an automatic shut-off valve for closing said gas feed line, said valve being operatively linked to a plurality of sensors which close said valve
    in the absence of a flame at the burner; or
    in the absence of fluid in said fluid container; or
    on the attainment of a preset temperature within said fluid.

2. The automatic shut-off, gas-flame heated, self-contained kettle as claimed in claim 1, wherein said housing is provided with a cover having a spout in fluid communication with said fluid container for pouring fluid therefrom, and a steam sensor for sensing the evolution of steam from the heated fluid and for closing said valve.

3. The automatic shut-off, gas-flame heated, self-contained kettle as claimed in claim 1, wherein said burner is of the type producing a concentrated rotating flame.

4. The automatic shut-off, gas-flame heated, self-contained kettle as claimed in claim 1, wherein said compressed gas container is disposable.

5. The automatic shut-off, gas-flame heated, self-contained kettle as claimed in claim 1, further comprising a spark ignition device.

6. The automatic shut-off, gas-flame heated, self-contained kettle as claimed in claim 5, further comprising a manually-operated "ON" control, which operates said spark ignition device and opens said shut-off valve by mechanical action.

7. The automatic shut-off, gas-flame heated, self-contained kettle as claimed in claim 6, wherein said shut-off valve is provided with a membrane through which said mechanical action is transferred, whereby the inlet of said valve may be connected to a source of high pressure gas without resulting leakage.

8. The automatic shut-off, gas-flame heated, self-contained kettle as claimed in claim 6, wherein said shut-off valve is provided with a solenoid, and a thermocouple is provided to project into the hot area of said gas burner, the electric power from said thermocouple charging the solenoid sufficiently to maintain said valve in its open position after release of said "ON" control.

9. The automatic shut-off, gas-flame heated, self-contained kettle as claimed in claim 8, wherein a circuit is arranged to switch off power supplied to said solenoid in response to a signal from any of multiple sensors, and a spring is provided to close said valve after said power is switched off.

10. A gas-flame heated, self-contained kettle as claimed in claim 1, wherein said housing is of a polymeric material.

11. A gas-flame heated, self-contained kettle as claimed in claim 10, wherein said housing is made of a thermoset polymeric material.

12. A gas-flame heated, self-contained kettle as claimed in claim 1, wherein said housing includes an aperture forming a gripping handle.

13. An automatic shut-off, gas-flame heated, self-contained kettle provided with reignition means, comprising:
    a housing;
    a gas burner contained within said housing;
    a container for the fluid to be heated, positioned within said housing and above said burner;
    a chamber within said housing for containing a compressed gas container;

a gas feed line leading from said compressed gas container to said gas burner;

exhaust ducts leading from an area above said burner, through said container, and out of a surface of said housing, whereby excess heat and combustion gases are exhausted in heat-exchange contact with fluid in said container via said ducts, for augmented heating of said fluid with simultaneous protection and insulation of said housing;

an electric battery;

an ion sensor projecting into the gas flame;

a spark ignition device which is connected to said electric battery and said ion sensor to reignite an extinguished gas flame; and an automatic shut-off valve for closing said gas feed line, said valve being operatively linked to a plurality of sensors which close said valve in the absence of fluid in said fluid container; or on the attainment of a preset temperature within said fluid.

* * * * *

UNITED STATES PATENT AND TRADEMARK OFFICE
CERTIFICATE OF CORRECTION

PATENT NO. : 5,690,094
DATED : November 25, 1997
INVENTOR(S) : Sheinfeld et al

It is certified that error appears in the above-identified patent and that said Letters Patent is hereby corrected as shown below:

In column 2, line 39, change "cheer" to --chamber--.

Signed and Sealed this

Seventh Day of December, 1999

*Attest:*

Q. TODD DICKINSON

*Attesting Officer*   *Acting Commissioner of Patents and Trademarks*